US007227945B2

(12) United States Patent
Keppel et al.

(10) Patent No.: US 7,227,945 B2
(45) Date of Patent: Jun. 5, 2007

(54) MODULAR COMMUNICATION ASSEMBLY

(75) Inventors: Ron Keppel, Trenton, NJ (US); A. Thomas Takacs, Yardville, NJ (US)

(73) Assignee: Electronic Micro Systems Inc., Hauppauge, NY (US)

( * ) Notice: Subject to any disclaimer, the term of this patent is extended or adjusted under 35 U.S.C. 154(b) by 193 days.

(21) Appl. No.: 10/631,290

(22) Filed: Jul. 31, 2003

(65) Prior Publication Data

US 2004/0147173 A1 Jul. 29, 2004

Related U.S. Application Data

(60) Provisional application No. 60/400,415, filed on Aug. 1, 2002.

(51) Int. Cl.
*H04M 1/00* (2006.01)

(52) U.S. Cl. ...................................... 379/453; 379/454

(58) Field of Classification Search ................ 379/453, 379/454; 312/223.4; 52/27.5
See application file for complete search history.

(56) References Cited

U.S. PATENT DOCUMENTS

| | | | |
|---|---|---|---|
| 3,752,927 A | 8/1973 | Bartley et al. | |
| 4,151,380 A | 4/1979 | Blomeyer et al. | |
| 4,155,108 A | 5/1979 | Tuttle et al. | |
| 4,169,308 A | 10/1979 | Minogue | |
| 4,246,451 A | 1/1981 | Nix | |
| 4,254,308 A | 3/1981 | Blomeyer et al. | |
| 4,488,013 A | 12/1984 | Ziegler | |
| 4,489,306 A | 12/1984 | Scolari | |
| 4,588,118 A | 5/1986 | Ferenc et al. | |
| 4,620,268 A | 10/1986 | Ferenc | |
| D288,441 S | 2/1987 | Lalonde | |
| 4,724,538 A | 2/1988 | Farrell | |
| 4,777,469 A | 10/1988 | Engelke et al. | |
| 4,788,711 A | 11/1988 | Nasco, Jr. | |
| 4,897,868 A | 1/1990 | Engelke et al. | |
| 4,951,182 A | 8/1990 | Simonson et al. | |
| 5,020,103 A | 5/1991 | Holland | |
| 5,196,988 A | 3/1993 | Horn | |
| 5,301,229 A | 4/1994 | Raynor | |
| 5,363,436 A | 11/1994 | McMonagle, Jr. et al. | |
| 5,452,188 A | 9/1995 | Green et al. | |
| 5,465,296 A | 11/1995 | McMonagle, Jr. et al. | |
| 5,475,751 A | 12/1995 | McMonagle, Jr. et al. | |
| D438,186 S | 2/2001 | Rodgers et al. | |
| 6,263,069 B1 * | 7/2001 | Schulze | 379/352 |
| 6,289,082 B1 | 9/2001 | Scheiding | |
| 6,419,511 B2 * | 7/2002 | Lizell | 439/210 |

* cited by examiner

*Primary Examiner*—William J. Deane, Jr.
(74) *Attorney, Agent, or Firm*—Dinsmore & Shohl LLP

(57) ABSTRACT

A modular communication support system includes a plurality of modular components configured to be secured to one another in a vertical arrangement, with one of the modular components having a communication device mounting member configured for supporting a communication device. The plurality of modular components are configured such that they may be assembled in a plurality of vertical arrangements.

16 Claims, 6 Drawing Sheets

FIG. 12
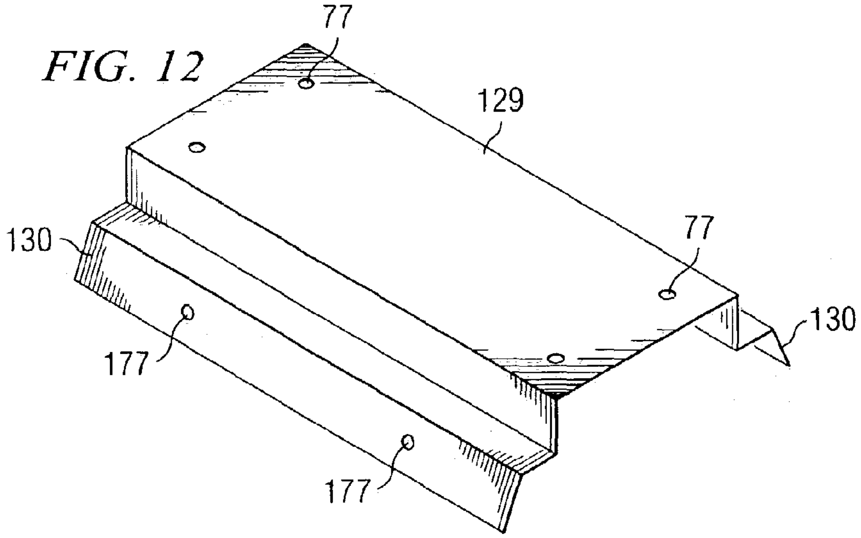
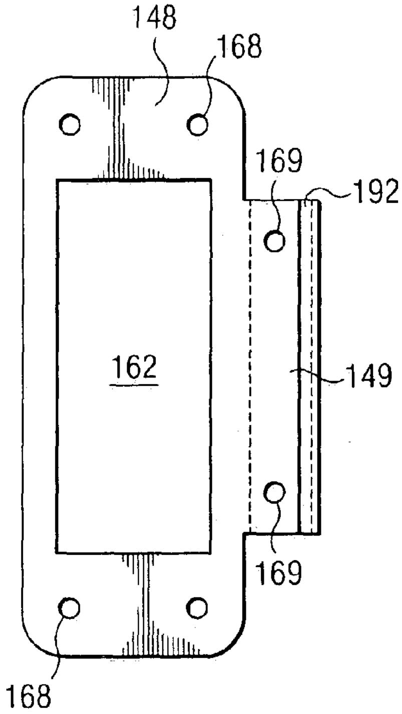
FIG. 13
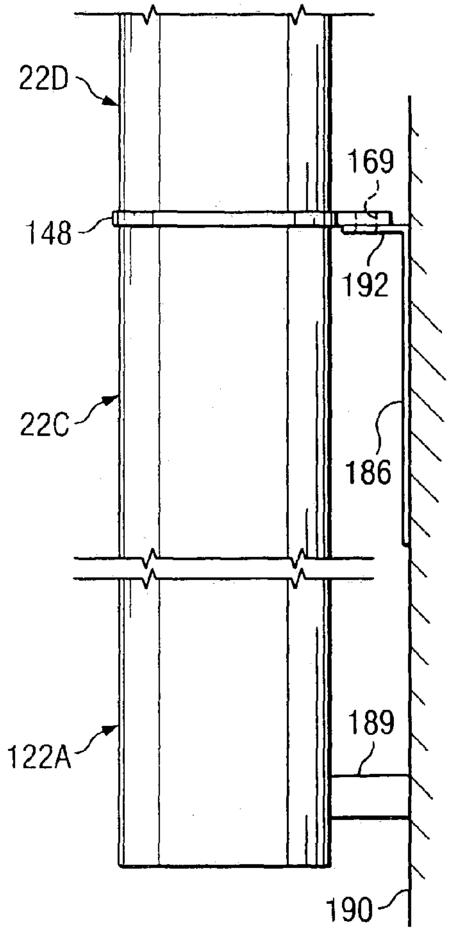
FIG. 14

MODULAR COMMUNICATION ASSEMBLY

CROSS-REFERENCES TO RELATED APPLICATIONS

This application claims the benefit of U.S. Provisional Application No. 60/400,415, filed Aug. 1, 2002.

FIELD OF THE INVENTION

The present invention is directed toward a communication assembly. One embodiment of the present invention provides a communication assembly comprised of modular components configured to be assembled in a plurality of arrangements.

BACKGROUND OF THE INVENTION

Telephone support assemblies are known in the art. For example, U.S. Pat. Nos. 4,151,380 and 4,254,308 each disclose a post-mounted, coin-operated, public telephone apparatus enclosed within a pole structure. However, such post-mounted telephone assemblies have multiple disadvantages. First, the pole structure itself is large and awkward, and more than one person is usually required to deliver and install the post. The additional manpower required to install these assemblies is usually costly and inefficient.

Second, post-mounted assemblies, being what their name suggests (i.e., a post), are typically uniform in shape and size with little or no room for customization. For some installations, the size of the assembly is important. Space limitations may dictate that the assembly fit within a particular confined area. On the other hand, some may desire a very large assembly in order to attract attention.

It may also be desirable to allow for the selection of Various options for a telephone assembly. For example, some may desire an assembly having an area light, a strobe light and a telephone, while others may desire various alternative configurations (e.g., an assembly having only a strobe light, with no area light).

SUMMARY OF THE INVENTION

It is an object of the present invention to provide a communication assembly configured to allow easy, cost-effective delivery and installation.

It is another object of the present invention to provide a communication assembly which may be configured in a variety of arrangements.

To achieve one or more of the foregoing and other objects in accordance with the present invention, a modular communication support system is provided. The modular communication support system includes a plurality of modular components configured to be secured to one another in a vertical arrangement, with one of the modular components comprising a communication device mounting member configured for supporting a communication device. The plurality of modular components are configured such that they may be assembled in a plurality of vertical arrangements.

A modular communication assembly is also provided, and comprises a tubular communication device mounting member configured to support a communication device, and a plurality of modular components secured to the tubular communication device mounting member in a vertical, end to end arrangement.

The present invention also provides a modular component for use in a modular communication assembly, wherein the modular component comprises a hollow tube having at least one recessed endwall, wherein this recessed endwall is configured for securing a plurality of modular components thereto.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 12 is a perspective view of the internal plate used with the endcap of FIG. 11;

FIG. 13 is a top plan view of a mounting bracket which may be used to mount a communication assembly to a vertical surface; and FIG. 14 is a side view of a communication assembly mounted to a vertical surface using the bracket of FIG. 13.

DETAILED DESCRIPTION OF EXEMPLARY EMBODIMENTS

The present invention provides a modular communication assembly and system comprising a plurality of modular components which may be assembled in a variety of vertical arrangements. Any number of modular components may be provided, such as a communication device mounting assembly, an extension sleeve, an area light assembly, and a strobe light assembly. These modular components can be arranged vertically in any number of configurations, and one or more of the modular components may even be omitted from the assembled unit. Of course it is also possible to add additional modular components, such as multiple area light components in a single communication assembly. In one embodiment, the modular components are tubular in construction, and have a similar cross-sectional shape. The end portions of these tubular modular components are configured such that the components may be readily attached to one another in end-to-end fashion. The end portions of the tubular modular components may be configured such that a modular component can be secured to any one of the other modular components, thereby allowing the communication assembly to be customized for a particular installation.

It should be pointed out that, although the present invention will be described for use with a telephone device, the communication assembly according to the present invention is not so limited. For example, rather than a telephone device, the communication assembly of the present invention may be used to support a two-way radio assembly, or even a one-way audio device which simply plays an audio message to an user. In fact, the communication assembly and system of the present invention may be used to support any of a variety of communication devices which provide one-way or two-way (or even more) audio or video communication. In addition, such communication may be via a wired connection, or by a wireless transmission (such as by radio signal or cellular phone signal).

Figure 1:
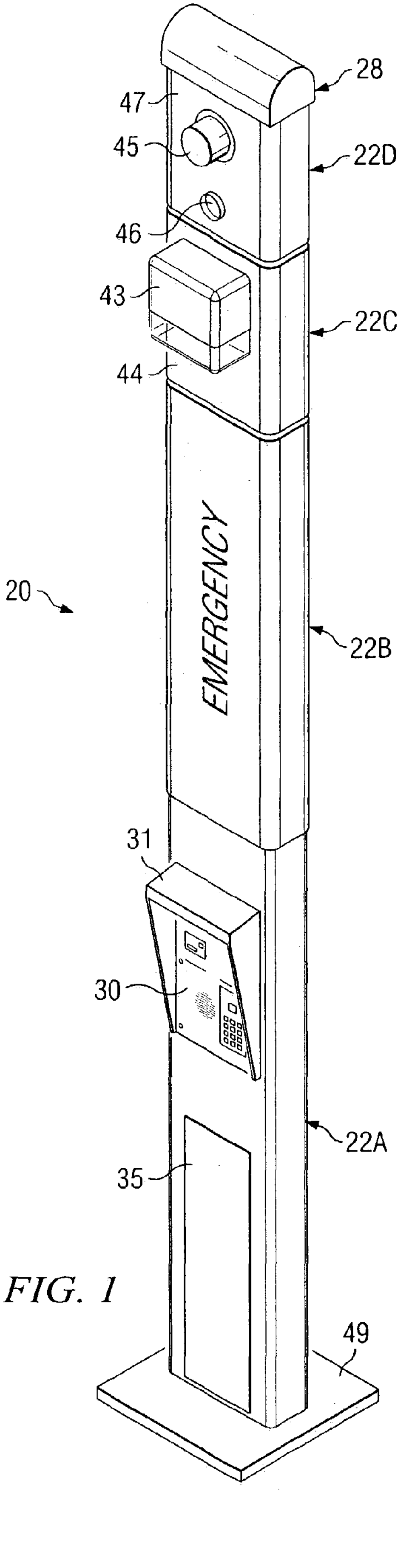
FIG. 1 is a front perspective view of a modular communication assembly according to one embodiment of the present invention.

Turning now to the drawings in detail, wherein like numbers indicate the same or corresponding elements throughout the views, FIG. 1 illustrates an exemplary embodiment of a modular communication assembly 20 comprising a plurality of modular components 22. In the embodiment of FIG. 1, modular communication assembly 20 may be mounted to a horizontal surface. As further described herein, a base member may be used to securely affix the modular communication assembly 20, in a vertical arrangement, with respect to a horizontal surface such as earth, concrete, blacktop or other horizontal surface. It is understood, however, that the modular communication assembly 20 can be configured to be mounted to any of a variety of surfaces, including, but not limited to a vertical surface (such as a wall). Mounting of the modular communication assembly to a vertical surface can be achieved by merely attaching a mounting member to any one or more of the modular components 22, or configuring at least one modular component 22 to support the modular communication assembly 20 with respect to a vertical surface.

In the embodiment of FIG. 1, the modular components include a communication device mounting member 22A, an extension sleeve 22B, a light assembly 22C and a strobe assembly 22D, all assembled in a vertical arrangement. The communications assembly depicted in FIG. 1, however, is merely an exemplary embodiment of the present invention, and various other embodiments may include one or more additional modular components not depicted in FIG. 1 and/or may omit one or more of the modular components shown in FIG. 1. Alternative modular components not shown in FIG. 1 may include, but are not limited to, power assemblies for providing electrical power to the communication assembly (e.g., a solar power module or a battery module), a telephone book housing assembly, an antenna and a storage compartment assembly.

Although the modular components 22 are similarly configured so that they may be assembled in a variety of vertical arrangements, each of the modular components 22 in FIG. 1 performs a different function. For example, the communication device mounting member 22A is configured to receive a telephone or other communication device. In the exemplary embodiment of FIG. 1, a telephone device 30 is received and supported by communication device mounting member 22A, and therefore mounting member 22A will be referred to herein as a telephone mounting member (however the scope of the present invention is not so limited). Telephone device 30 depicted in FIG. 1 is a model T2110 emergency telephone device available from Electronic Micro Systems of Hauppauge, N.Y., however, any of a variety of telephone devices available from a variety of sources may be used in the communication assemblies according to the present invention.

While a telephone device may be attached to mounting member 22A by a variety of means, mounting member 22A in the embodiment of FIG. 1 includes an opening 40 in its front face (see FIG. 7) that is sized and configured to receive telephone device 30 therein. In an alternative embodiment, a housing member may first be mounted within opening 40 of mounting member 22A, and telephone device 30 may then be secured within the housing member. Telephone mounting member 22A may also be configured to receive a plurality of telephone devices in the same manner (e.g., a pair of telephone devices positioned on opposite sides of telephone mounting member 22A). In addition, the location of the telephone device 30 may be varied from that shown, as desired.

As also shown in FIG. 1, a hood 31 may be positioned adjacent telephone device 30 in order to provide protection for the front face of telephone device 30. Hood 31 may also include a light which provides illumination of the front face of telephone device 30 in order to improve visibility during use. Hood 31 may be a separate component secured to telephone mounting member 22A, or may even be provided as an integral component of telephone device 30.

It should also be pointed out that telephone mounting member 22A can be provided in a variety of lengths and widths. However, it is desirable that the cross-sectional size and shape of the modular components be similar (or even substantially identical) to one another in order to provide an aesthetically-pleasing appearance for the communication assembly and to facilitate the ability to vary the vertical arrangement of the modular components. For example, although telephone mounting member 22A is depicted in FIG. 1 as the lowermost modular component in the communication assembly, an embodiment of the present invention allows the modular components to be arranged in a plurality of vertical arrangements. Thus, telephone mounting member 22A may be located, for example, above extension sleeve 22B so that the telephone device will be at a higher position on the communication assembly.

Telephone device 30 can comprise any of a variety of communication devices, such as an emergency telephone device configured to communicate with a pre-determined responder (e.g., an emergency services dispatcher). Such telephone devices can include a conventional handset, or may have a speaker/microphone integrated into the device itself. These emergency telephone devices may also be push-button activated, voice-activated, and/or may even include a numeric keypad for conventional dialing. However, the present invention is not limited to communication assemblies for emergency telephones. Thus, telephone device 30 can also comprise, for example, a coin-operated, push-button telephone. Furthermore, it is appreciated that telephone device 30 can be configured to provide communication via a standard telephone line, a wireless signal (e.g., a cellular phone signal), or any of a variety of other means. In addition, telephone device 30 can be configured to be powered in a variety of manners including, but not limited to, a standard electrical connection from a power line, solar power, one or more batteries, or a combination of one or more of these.

Another modular component in the communication assembly shown in FIG. 1 is extension sleeve 22B. Like telephone mounting member 22A, extension sleeve 22B can be provided in a variety of lengths and widths. However, as mentioned previously, it is desirable that the cross-sectional size and shape of the modular components be similar (or even substantially identical). In addition, extension sleeve 22B may be configured such that it can be positioned at a variety of positions in the vertical arrangement.

Figure 2:
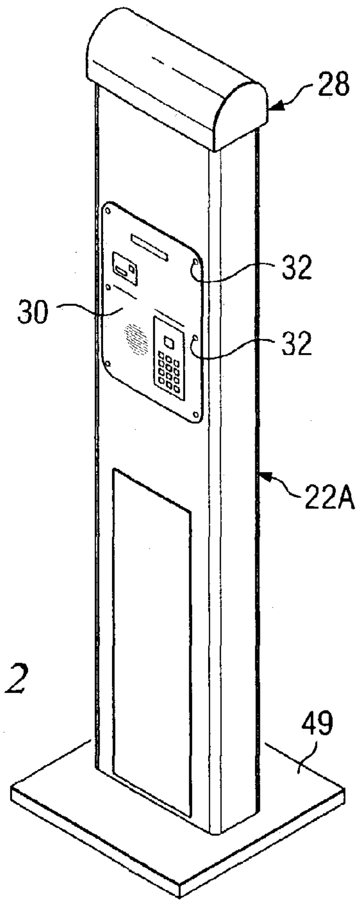
FIG. 2 is a front perspective view of a modular communication assembly according to one embodiment of the present invention.

In the exemplary embodiment of FIG. 1, extension sleeve 22B may serve multiple functions. First, extension sleeve 22B may be used to extend the length of the modular communication assembly 20. Thus, by modifying the length of the extension sleeve 22B (or by providing a plurality of lengths to choose from), the height of the modular communication apparatus can be customized. Of course in other embodiments the extension sleeve may be eliminated from the modular communication assembly 20 if a shorter assembly is desired (such as shown in FIG. 2).

Extension sleeve 22B may also serve to elevate certain modular components positioned above the extension sleeve, such as the light assembly 22C or the strobe assembly 22D. The elevation of the modular components 22 positioned above extension sleeve 22B not only moves these components out of the reach of would be vandals, it also serves to make these components more visible. In addition, the elevation of light assembly 22C may also increase the size of the area lit thereby. Extension sleeve 22B also provides space for the placement of written or graphical material. For example, in FIG. 1, the word "EMERGENCY" is placed on the extension sleeve 22B to inform the public that the modular communication assembly 20 serves as an emergency telephone. In another embodiment, the extension sleeve may contain advertising material, consumer information, directions, or other graphical or written material.

The light assembly modular component 22C can be provided in a variety of lengths and widths and may be positioned at any location in the vertical arrangement. Once again, however, it is desirable that the cross-sectional size and shape be similar or even substantially identical to that of the other modular components. Light assembly 22C may include any of a variety of illuminating devices attached to the tubular sleeve structure. In the embodiment shown in FIG. 1, an area light 43 is attached to tubular sleeve 44 of light assembly 22C. Area light 43 is configured and positioned so as to illuminate the general area beneath area light 43, including the general area of the telephone device 30. In fact, as shown in FIG. 1, area light 43 is configured to provide generally downward illumination. Of course a variety of other types of lights may be used, and multiple lights may be positioned on light assembly 22C.

The modular components of the assembly shown in FIG. 1 also include a strobe light assembly 22D. Like the other modular components, strobe light assembly 22D may be provided in a variety of lengths and widths, however it is desirable that the cross-sectional size and shape be similar or even substantially identical to that of the other modular components. In the exemplary embodiment shown in FIG. 1, strobe light assembly 22D includes a blue light 45 and strobe light 46 mounted to tubular sleeve 47. Blue light 45 emits a light blue in color which will call attention to the location of the communication assembly. Of course any of a variety of other lights, including various colors of light, may be used for this purpose, and blue light 45 may even be omitted from strobe light assembly 22D if desired. Strobe light 46 will emit short bursts of high intensity light intended to attract attention to communication assembly 20. Thus, rather than providing general illumination of the area surrounding the communication assembly, strobe light 46 is intended to direct attention to the assembly from a distance.

Blue light 45 and strobe light 46 may be individually configured to operate continuously, operate when light in the surrounding area falls below a certain level (e.g., at night), or operate only after a user has activated telephone device 30 (e.g., only during an emergency, as indicated by use of the telephone device). Of course blue light 45 and strobe light 46 are merely exemplary, and a variety of other devices may be used to signal the location of communication assembly 20. These include, for example, one or more sound-emitting devices such as a siren or the like. In addition, multiple blue lights and/or strobe lights may be used, and one or more of these lights may even be used in conjunction with one or more other marking devices (such as a siren or other sound-emitting device).

The communication assembly of FIG. 1 also includes an endcap 28 which is affixed to the upper end of the uppermost modular component 22. As further described herein, endcap 28 may be configured to be attached to any of the modular components, thereby allowing communication assembly 20 to be assembled in any of a variety of vertical configurations. Endcap 28 not only provides an aesthetically-pleasing appearance to the upper end of the assembly, it also acts to prevent moisture from entering the interior of the other modular components (particularly since the upper end of each modular component may be open).

The modular communication assembly of FIG. 1 may be customized simply by altering the vertical arrangement of the modular components 22, and/or by adding or eliminating one or more modular components from the assembly. For example, FIG. 2 depicts an alternative arrangement wherein extension sleeve 22B, light assembly 22C, and strobe light assembly 22D have been eliminated. In the communication assembly of FIG. 2, therefore, only telephone mounting member 22A and endcap 28 remain. Such an arrangement may be useful in situations wherein telephone device 30 is not intended for use in emergency situations. However, the very same telephone mounting member 22A and endcap 28 used in the assembly of FIG. 1 may be used to assemble the communication assembly of FIG. 2. Of course, it is also possible that, for example, light assembly 22C could be positioned between telephone mounting member 22A and endcap 28 in the assembly of FIG. 2, if desired.

As yet another alternative, the arrangement of the modular components of the communication assembly 20 in FIG. 1 could be rearranged. For example, an additional extension sleeve 22B could be positioned between light assembly 22C and strobe light assembly 22D, thereby further elevating the strobe light in order to improve visibility of the communication assembly from a distance. It is thus appreciated that the modular communication assembly of the present invention as illustrated in FIGS. 1-2 may be assembled in a plurality of vertical arrangements.

Figure 3:
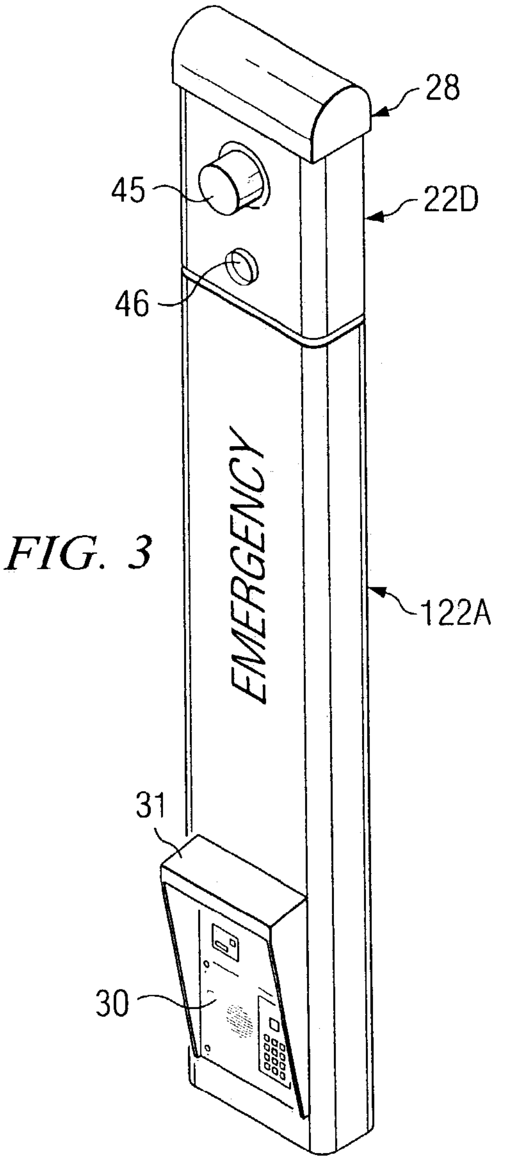
FIG. 3 is a front perspective view of a modular communication assembly according to one embodiment of the present invention.

As mentioned previously, the communication assembly according to one embodiment of the present invention also may be configured for mounting to a vertical surface such as a wall. However, many or all of the same modular components used in the communication assembly shown in FIGS. 1 and 2 may be used to assemble a wall-mounted communication assembly. FIG. 3 depicts one embodiment of a wall-mountable communication assembly according to the present invention. In the embodiment of FIG. 3, however, telephone mounting member 122A is modified slightly from telephone mounting member 22A shown in FIGS. 1 and 2. In particular, mounting cover 49 and the associated mounting flange (described further herein) have been eliminated at the base of telephone mounting member 122A. Furthermore, telephone device 30 has been relocated to the lower end of telephone mounting member 122A, as shown. Although not depicted in FIGS. 3 and 4, a mounting bracket (as further described herein) may be used to attach the communication assembly to a vertical surface such as a wall. Of course one skilled in the art will recognize that, by suitable modifications, telephone mounting members 22A and 122A may be configured to allow for mounting to both a horizontal surface (such as the ground) and a vertical surface (such as a wall).

Figure 4:
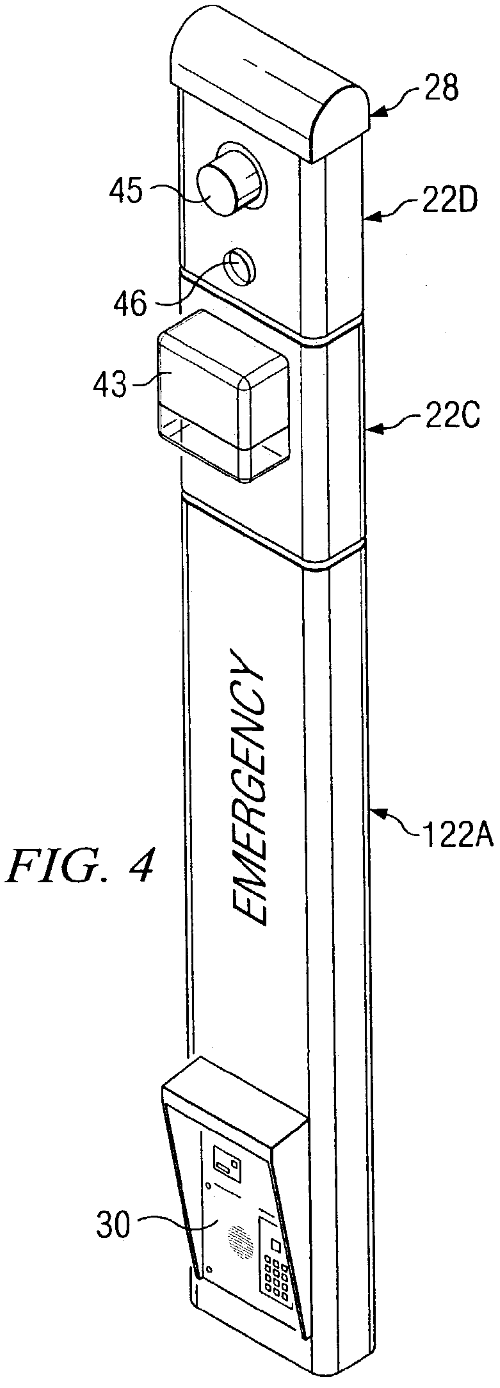
FIG. 4 is a front perspective view of a modular communication assembly according to one embodiment of the present invention.

Although telephone mounting member 122A in FIGS. 3 and 4 has been modified slightly from telephone mounting member 22A in FIGS. 1 and 2, the communication assembly of FIG. 3 does include strobe light assembly 22D and endcap 28, as used in the assemblies of FIGS. 1 and 2. Since telephone mounting member 122A has the same (or substantially the same) tubular configuration as telephone mounting member 22A (as well as the other modular components), telephone mounting member 122A may be used with any or all of the modular components previously described. Therefore, although not shown, extension sleeve 22B and light assembly 22C could also be used in conjunction with the wall-mounted communication assembly of FIG. 3. It will also be noted that, since telephone device 30 is located adjacent the lower most end of telephone mounting member 122A, the outer surface of telephone mounting member 122A is available for the placement of written or graphical material, such as the word "EMERGENCY" shown in FIG. 3.

FIG. 4 depicts yet another alternative arrangement for a wall-mounted communication assembly, wherein light assembly 22C has been positioned between telephone mounting member 122A and strobe light assembly 22D. In this fashion, wall-mounted versions of the communication assembly according to an embodiment of the present invention may be customized to suit particular needs, such as, in the case of FIG. 4, the inclusion of a light assembly 22C for providing illumination of the general area around the assembly.

As previously mentioned, each modular component 22 of FIGS. 1–4 is similarly configured so that it may affixed to another modular component 22 and assembled in a variety of vertical arrangements. The structure of an individual modular component 22 in accordance with the present invention and the affixation between two modular components 22 is discussed below.

Figure 5:
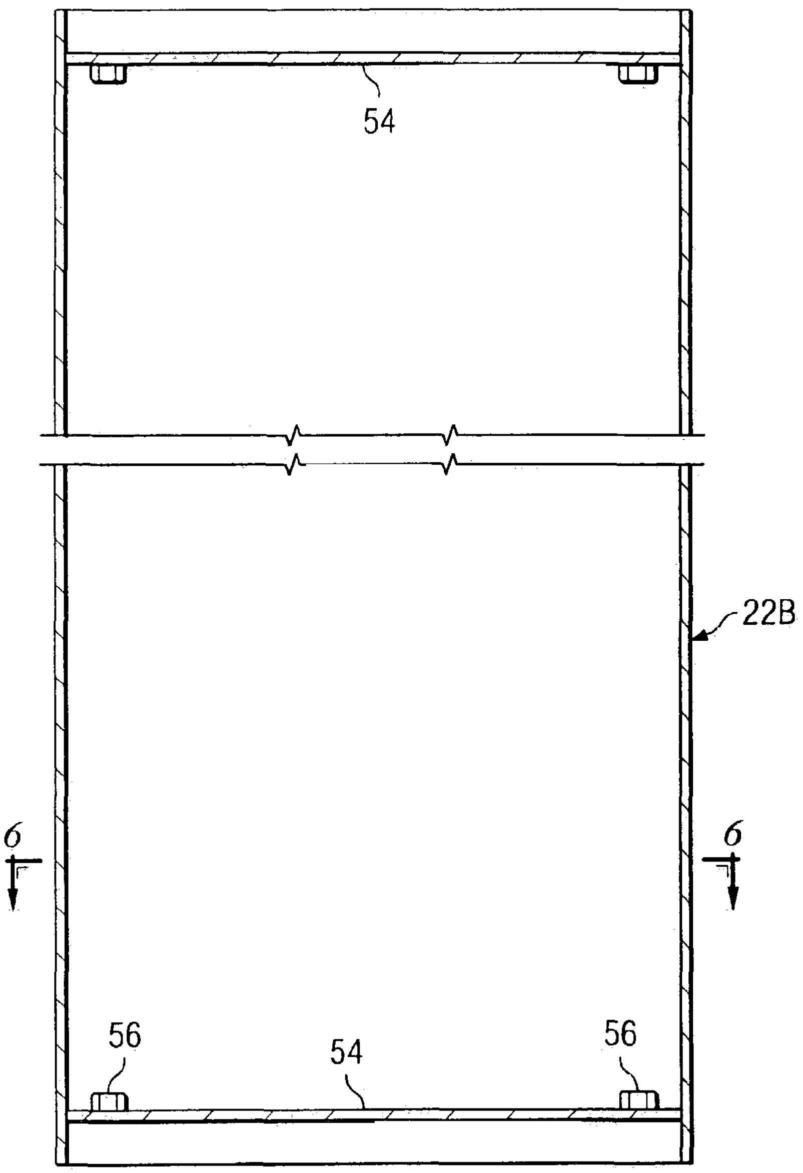
FIG. 5 is a cross-sectional view of an exemplary modular component used in one embodiment of a communication assembly according to the present invention.

FIG. 5 is a cross-sectional view of extension sleeve 22B in accordance with one embodiment of the present invention. Extension sleeve 22B, like the other modular components, is tubular in shape, and has a generally rectangular cross-sectional shape (with rounded corners). In other embodiments, the modular components 22 may be provided in a variety of cross-sectional shapes including, but not limited to, square, circular and polygonal. Regardless of the cross-sectional shape chosen, however, it is preferred that the modular components have substantially the same cross-sectional shape in order to not only provide an aesthetically-pleasing appearance, but also to allow for greater flexibility in the vertical arrangement of the various components.

The tubular construction of the modular components provides several advantages. For example, the tubular configuration provides a central passageway through which various wires and other electrical connections may pass. In addition, the central passageway also facilitates securing one modular component to another. Furthermore, the tubular structure is generally lightweight, and can be readily fabricated from a variety of materials (such as 304 stainless steel).

Figure 6:
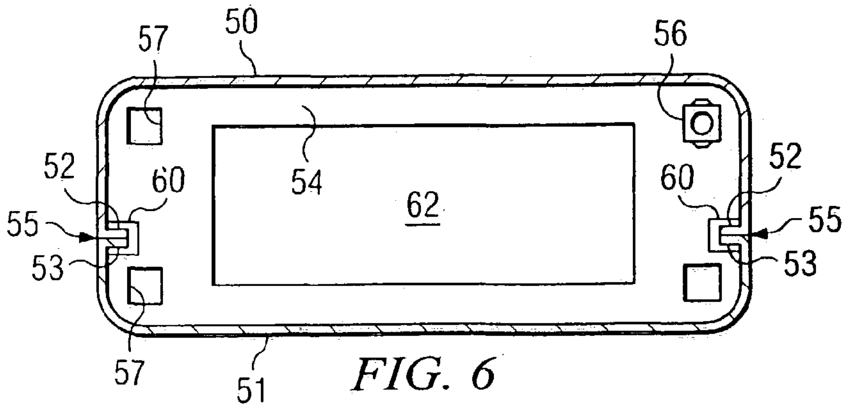
FIG. 6 is a cross-sectional view of the exemplary modular component of FIG. 5, taken along the line 6—6 thereof.

In the exemplary modular component comprising extension sleeve 22B shown in FIGS. 5 and 6, the tubular structure is provided by two U-shaped pieces of sheet metal which are welded together. It should be noted that the resulting seam 55 is shown in FIG. 8, however the seam has been omitted from various modular components shown in FIGS. 1–4, 7 and 14. Of course the formation of a tubular structure by welding two U-shaped pieces of sheet metal to one another is merely exemplary of one technique for forming the tubular modular components of the present invention. For example, the modular components may also be formed by fabricating a tubular structure from a single piece of sheet material (such as stainless steel) and securing this tubular structure by a single weld which joins opposite edges of the sheet material to one another. Of course such a construction would result in a single seam extending lengthwise along one surface of the tubular modular component. Various other fabrication techniques may also be used, such as extrusion, molding or various other fabrication techniques well-known to those skilled in the art. In addition, the tubular modular components may also be fabricated from materials other than sheet metal, such as various types of plastic.

In the embodiment shown in FIGS. 5 and 6, extension sleeve 22B is formed from first and second U-shaped portions 50 and 51 which are welded together as shown in FIGS. 6 and 8. Each U-shaped portion may be formed by longitudinally bending an appropriate length and width of sheet metal to provide the structure shown in FIGS. 6 and 8. U-shaped portions 50 and 51 each include inwardly-extending flanges 52 and 53, respectively, positioned along the longitudinal edges of the U-shaped member. The flanges 52 on U-shaped member 50 are configured to mate with the associated flanges 53 on U-shaped member 51. U-shaped members 50 and 51 may be welded to one another along flanges 52 and 53, such as by internal spot welding. In this manner, the welds will not be visible from the exterior of the tubular extension sleeve 22B.

Endwalls 54 may be welded in the interior of extension sleeve 22B, adjacent each end thereof. In the embodiment shown in FIGS. 5 and 6, each endwall 54 comprises a flat metal sheet having a central hole 62, as shown. By providing a central hole 62 in each endplate, a continuous passageway extends through the entire length of extension sleeve 22B.

Each endplate 54 is configured to snuggly fit within the interior of tubular extension sleeve 22B, and therefore cutout portions 60 are provided in order to accommodate welded flanges 52 and 53 of U-shaped members 50 and 51. Each endplate 54 also includes a plurality of apertures 57 arranged at predetermined locations on each endplate. In the embodiment shown in FIGS. 5 and 6, square apertures are symmetrically positioned adjacent each of the four corners of endplate 54, as shown. These apertures are sized and configured to accept a panel nut retainer 56, such as a cage-style panel nut retainer. Such panel nut retainers essentially comprise a retainer which holds a threaded nut securely against the square aperture. In fact, the threaded nut portion of the panel nut retainers 56 are visible in FIG. 5. The panel nut retainers 56 are also visible in the exploded view of FIG. 8.

Of course it is also contemplated that a variety of other structures may be used for securing one modular component to another. For example, the panel nut retainers may be replaced by threaded nuts welded to the interior surface of endplates 54, adjacent apertures 57.

It should also be pointed out that apertures 57 need not be square in shape. For example, as shown on endplate 54 secured within the lower end of light assembly 22C in FIG. 8, apertures 57 may have a circular shape. In addition, since endplate 54 positioned in the upper end of extension sleeve 22B includes panel nut retainers 56, panel nut retainers or other threaded fastener receiving devices (such as threaded nuts) need not be mounted to endplate 54 in the lower end of light assembly 22C. Rather, threaded fasteners such as bolts 70 may merely be inserted through the circular apertures 57 on endplate 54 in light assembly 22C so as to threadingly engage panel nut retainers 56 positioned on endplate 54 of extension sleeve 22B.

One advantage of using panel nut retainers 56, however, is that these retainers may be readily attached to or removed from an endplate 54, as needed. In this fashion, if each endplate 54 is identically configured to receive panel nut retainers at predetermined locations, the panel nut retainers may be attached to endplates 54 as needed to assemble the communication assembly. For example, in the configuration of FIG. 8, panel nut retainers 56 may be attached to endplate 54 of extension sleeve 22B, while the panel nut retainers are not needed in the endplate at the lower end of light assembly 22C. It should also be pointed out that the endplates utilized in the embodiment of FIG. 7 obviously include circular apertures and no panel nut retainers are depicted. However, threaded nuts may be welded to the underside of endplate 54 on telephone mounting member 22A adjacent apertures 57 such that these threaded nuts will threadingly receive bolts 70 in order to attach extension sleeve 22B to telephone mounting member 22A.

Although FIGS. 5 and 6 depict the structure of tubular extension sleeve 22B, it will be understood that the various other modular components may be constructed in the same manner. In addition, these tubular modular components may include additional internal structural features which facilitate the mounting of associated components thereto. For example, light assembly 22C may be configured so as to have an opening in an outer wall through which area light 43 protrudes. Area light 43 may then be internally mounted and secured within tubular member 44 of light assembly 22C (such as using welds, threaded fasteners, and/or other mounting techniques well-known to those skilled in the art). Regardless of the internal structure of each modular component, however, the overall tubular structure of each modular component may be the same as that shown in FIGS. 5 and 6. In addition, each modular component may include endplates similar to those shown in FIGS. 5 and 6, including apertures and the like located at predetermined locations in order to facilitate the attachment of the modular components to one another.

FIG. 8 depicts an exploded view of an extension sleeve 22B being attached to the lower end of a light assembly 22C. It will be understood, however, that the various modular components of the present invention may be secured to one another in the very same manner as shown in FIG. 8. As seen in FIG. 8, as well as FIGS. 5 and 6, endplates 54 may be positioned within the tubular members such that the endplate is spaced inwardly from the endwall of the U-shaped portions. In other words, endplate 54 is not flush with the endwall of extension sleeve 22B, as seen in FIG. 8. In this manner, a gasket 66 (such as a rubber or other polymeric gasket) may be positioned atop endplate 54. Gasket 66 may have the same general shape as endplate 54, with apertures 68 positioned in gasket 66 so as to align with the apertures in endplate 54. Cutout portions 69 are also provided in gasket 66 in order to accommodate the welded flanges of the extension sleeve 22B. Gasket 66 further includes a central opening which aligns with the opening in endplate 54. Thus, gasket 66 may be aligned on top of endplate 54 in a predetermined orientation.

Light assembly 22C in FIG. 8 has a tubular configuration similar to that of extension sleeve 22B. Thus, an endplate 54 is situated in the interior of light assembly 22C, spaced slightly away from the endwall of the U-shaped components. When gasket 66 is positioned atop endplate 54 of extension sleeve 22B, and light assembly 22C is lowered onto extension sleeve 22B in the manner shown, gasket 66 will be positioned between the endplates of extension sleeve 22B and light assembly 22C. Threaded fasteners (such as bolts 70) may then be passed through the apertures in endplate 54 on light assembly 22C and threadingly engage the threaded nuts provided on endplate 54 of extension sleeve 22B. As bolts 70 are tightened, gasket 66 will be compressed between extension sleeve 22B and light assembly 22C, until the endwalls of extension sleeve 22B and light assembly 22C engage one another. In this manner, gasket 66 forms a seal between the two modular components in order to prevent moisture from entering the interior of the communication assembly.

Figure 7:
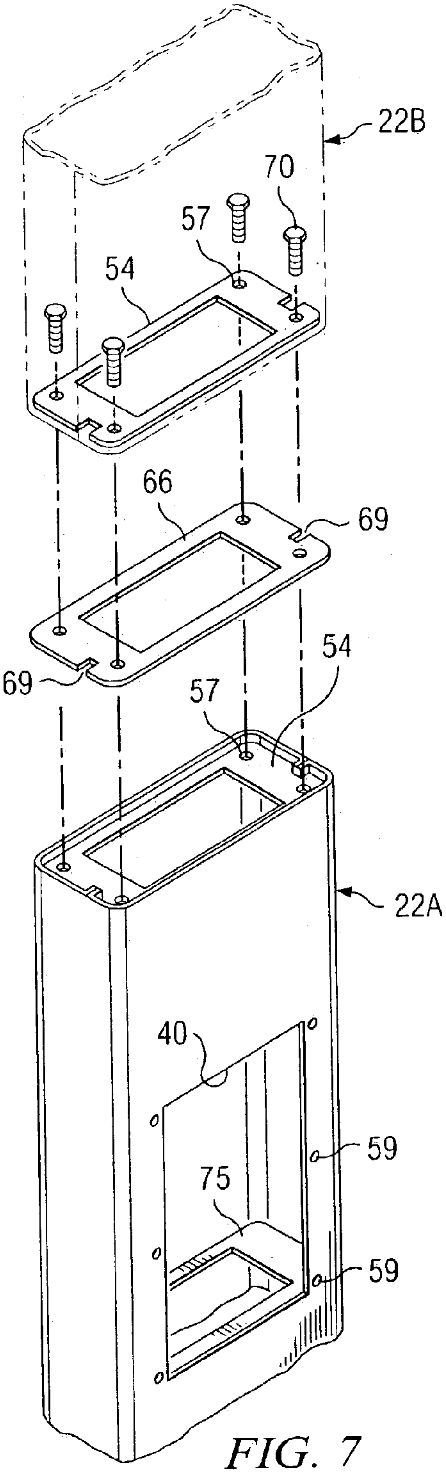
FIGS. 7 and 8 are exploded views depicting the affixation of two modular components to one another.
Figure 8:
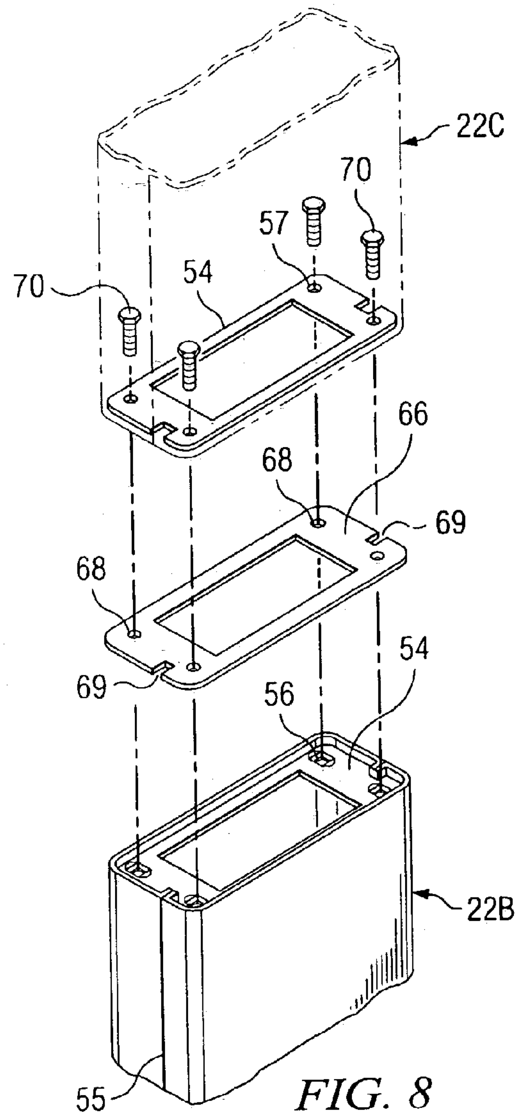

FIG. 7 is similar to FIG. 8, and depicts the manner in which an extension sleeve 22B may be secured to a telephone mounting member 22A. As will be noted in FIG. 7, the method of attachment is the same, regardless of which modular components are being mounted to one another. Thus, it will be recognized that the modular components may be attached to one another in a variety of vertical arrangements.

As also shown in FIG. 7, telephone mounting member 22A includes a rectangular opening 40 into which telephone device 30 may be inserted. If desired, in order to facilitate mounting of telephone device 30, telephone mounting member 22A may include a support platform 75 welded within the interior of the tubular sleeve of telephone mounting member 22A, adjacent the lower end of opening 40. In this fashion, platform 75 may be used to support telephone device 30 within opening 40. Telephone device 30 may then be secured to telephone mounting member 22A by conventional means. For example, as best seen in FIG. 2, telephone device 30 may include a front plate having a plurality of threaded bolts or screws 32 extending therethrough at predetermined locations. As best seen in FIG. 7, telephone mounting member 22A may include corresponding apertures 59 positioned so as to receive the threaded bolts or screws 32 of telephone device 30. In the embodiment of FIG. 7, apertures 59 are positioned adjacent the parameter of rectangular opening 40. Apertures 59 may be threaded or alternatively threaded bolts or other similar devices may be positioned in the interior of telephone mounting member 22A adjacent apertures 59. In this manner, telephone device 30 may be secured to telephone mounting member 22A using threaded bolts or screws 32. It will thus be recognized that the face plate of telephone device 30 will be somewhat larger than rectangular opening 40. In addition, as is known to those skilled in the art, screws or bolts 32 used to mount telephone device 30 to telephone mounting member 22A may be of the tamper-proof variety.

Figure 9:
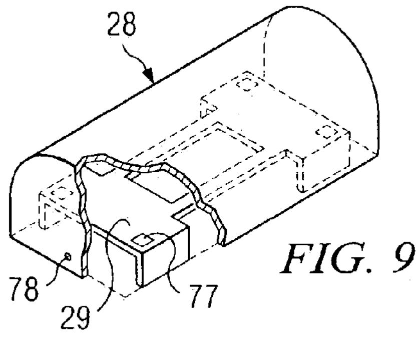
FIG. 9 is a perspective view of an endcap according to one embodiment of the present invention.

FIG. 9 is a partially broken-away view of an endcap 28 which may be mounted to the upper end of any one of the modular components described above. Endcap 28 may be slightly larger (in both length and width) than the cross-sectional dimensions of the modular components so that endcap 28 will overhang slightly. Such overhang will help to further prevent moisture from entering the interior of the communication assembly. Endcap 28 may have any of a variety of shapes, however, the embodiment shown in FIG. 5 generally has the shape of an inverted half cylinder. The interior of endcap 28 may be hollow, and may include an interior plate 29 welded therein. Interior plate 29 may be shaped and configured to allow endcap 28 to rest upon the upper end of one of the modular components.

As also shown in FIG. 9, interior plate 29 of endcap 28 may include a plurality of apertures 77 arranged in the same manner as apertures 57 on endplates 54. Panel nut retainers may be secured within apertures 77, as described previously, in order to receive threaded fasteners positioned in an endplate 54 of a tubular modular component to which endcap 28 is to be attached. For example, in the embodiment shown in FIG. 2, threaded bolts may be inserted through the apertures on the endplate positioned in the upper end of telephone mounting member 22A so as to threadingly engage the threaded nuts positioned adjacent apertures 77 on endcap 28 such that endcap 28 will be secured to telephone mounting member 22A. Of course the other fastening techniques mentioned above may also be used, such as threaded nuts welded to interior plate 29 adjacent aperture 77. If desired, a gasket 66 may also be positioned between interior plate 29 and the endplate 54 of the modular component to which endcap 28 is attached.

As yet another alternative, as also seen in FIG. 9, one or more threaded apertures 78 may be provided on opposite ends of endcap 28. It will be noted that only one threaded aperture 78 is depicted in FIG. 9, and a second threaded aperture may be positioned on the opposite endwall of endcap 28. In this manner, endcap 28 may be secured to a modular component by positioning the endcap on top of the modular component and driving set-screws through threaded apertures 78 such that the set-screws will engage the outer sidewalls of the modular component upon which endcap 28 is positioned. Attaching endcap 28 in this manner may be advantageous, particularly if the communication assembly is assembled from the bottom up (i.e., endcap 28 is the last component added to the communication assembly).

Figure 10:
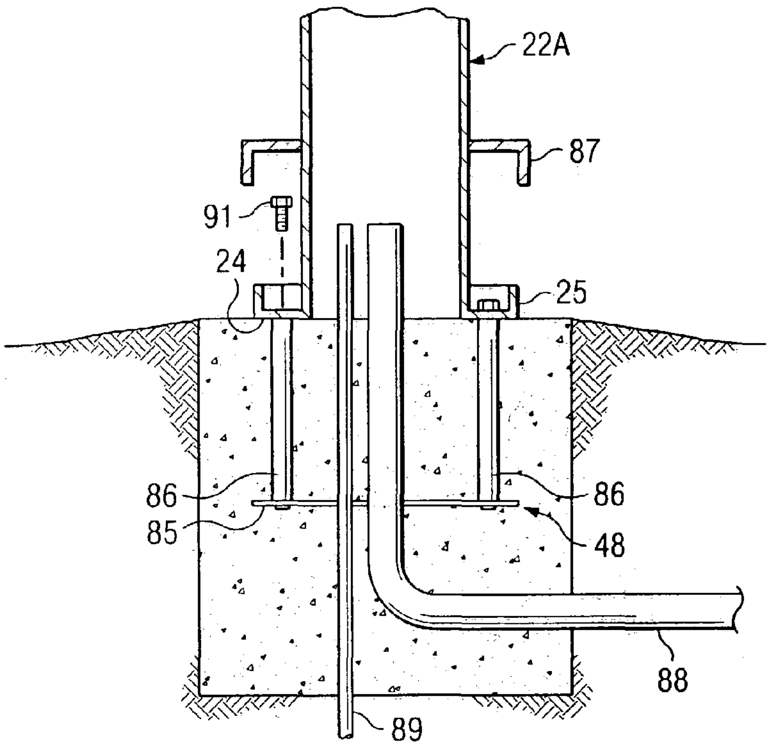
FIG. 10 is a cross-sectional view depicting the mounting of a communication assembly to a horizontal surface.

The communication assembly of the present invention may be mounted to a horizontal surface by a variety of means. For example, a mounting apparatus configured to engage the lower end of a modular component (such as an endplate 54) may be used for this purpose. Alternatively, and as shown in FIG. 10, the lower end of telephone mounting member 22A may be specifically configured for this purpose. In this manner, the lower end of telephone mounting member 22A will be configured differently than the lower end of the other tubular modular components. In particular, as best seen in FIG. 10, a mounting flange 24 may extend about the parameter of the lower most endwall of telephone mounting member 22A. Flange 24 may extend about the entire periphery of the lower end of telephone mounting member 22A, and may include a plurality of apertures sized and configured to accept a threaded fastener such as a bolt. As also seen in FIG. 10, an upperwardly extending lip 25 may also be provided, extending upperwardly away from the outer edge of flange 24.

Base member 48 generally comprises a flat plate 85 having a plurality of hollow bolts 86 extending upperwardly away therefrom. The interior of hollow bolts 86 is threaded in order to accept a fastener. As seen in FIG. 10, base member 48 may be positioned beneath the horizontal surface upon which the communication assembly is to be mounted. Base member 48 may be embedded in a concrete pad 90, for example, such that the upper end of hollow bolts 86 is flush with the upper surface of concrete pad 90. Telephone mounting member 22A may be positioned atop the concrete pad, with the apertures in flange 24 aligned with the hollow bolts. In this manner, threaded fasteners (such as threaded bolts 91) may be threadingly inserted through the apertures in flange 24 into the hollow bolts 86 in order to secure telephone mounting member 22A, and hence the communication assembly, to the concrete pad. A cover plate 87 may then be lowered over flange 24 and lip 25 in order to conceal the bolts securing the communication assembly to the concrete. This cover plate may be secured to the upper lip 25 by a variety of means, such as threaded fasteners.

As also noted in FIG. 10, electrical and communication wires 88, as well as a ground rod 89, may enter the interior of the communication assembly through the concrete pad and into the hollow lower end of telephone mounting member 22A. These electrical and communication wires may include, for example, telephone communication wires and wires providing power to the communication assembly. Since a passageway is provided in the interior of the communication assembly along its entire length, these wires may pass through the interior of the communication assembly to the appropriate components.

During assembly, the electrical and communication wires from each of the modular components (e.g., electrical and communication wires to telephone device 30 and electrical power supply wires to light assembly 22C and strobe light assembly 22D) may be configured to extend downwardly through the interior of the modular components into the interior of the lowermost modular component. In the case of FIG. 1, for example, these wires will extend into telephone mounting member 22A. In order to facilitate attachment of all of the various electrical and communication wires, the lowermost modular component may include one or more distribution panels. For example, in the embodiment of FIG. 1, a distribution panel may be located in the interior of telephone mounting member 22A near the lowermost end. In fact, an access panel 35 (see FIG. 1) may even be provided in order to facilitate access to the distribution panel and the various electrical and communication wires. The electrical and communication wires 88 entering through the lower end of telephone mounting member 22A may be attached to the distribution panel at predetermined locations. Likewise, the various electrical and communication wires from the modular components may also be attached to the distribution panel at predetermined locations. In this manner, attachment of the various electrical and communication wires to one another will be greatly simplified. For example, a single pair of electrical power supply wires may enter at the lower end of telephone mounting member 22A and be attached to the distribution panel, with the distribution panel providing the circuitry necessary for providing electrical power to each of the various modular components, as needed.

Figure 11:
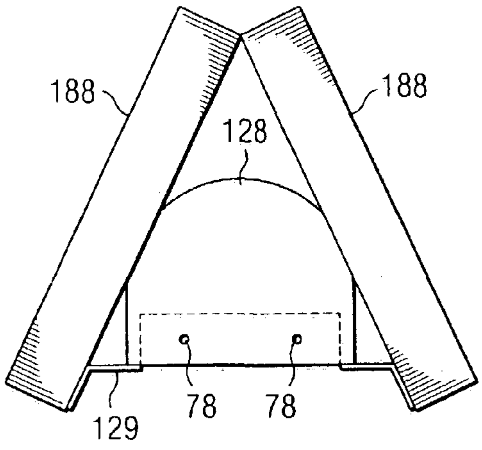
FIG. 11 is an end view of an alternative embodiment for an endcap which includes solar panels mounted thereto.

FIG. 11 depicts an alternative embodiment of an endcap which may be used with the communication assembly of the present invention. Endcap 128 in FIG. 11 is similar in shape to endcap 28 of FIG. 9. However, interior plate 129 (shown in FIG. 12) is modified from interior plate 29 shown in FIG. 9. In particular, interior plate 129 is configured to include a pair of angled support flanges 130 which extend away from opposite sides of endcap 128.

When interior plate 129 is positioned as shown in FIG. 11, interior plate 129 may still be used to mount endcap 128 to another modular component in the same manner as described previously with respect to endcap 28 (e.g., utilizing apertures 77 and associated threaded nuts and the like, or using threaded apertures 78 and set-screws). However, angled support flanges 130 are positioned so as to extend downwardly away from endcap 128 at an angle thereto. One or more solar panels 188 may be attached to angle support flanges 130 by, for example, one or more threaded fasteners extending through apertures 177 on angled support flanges 130. Solar panel 188 will thus be positioned at an appropriate angle to receive sunlight and convert such sunlight into electrical power for the communication assembly. Electrical power provided by solar panels 188 may be used to power the entire communication assembly, or may be used in conjunction with conventional electrical power supplied through electrical wires 88 and/or one or more batteries. It will also be recognized that one or more storage batteries may be included in the communication assembly (for example, in any of the modular components and/or in endcap 128) in order to store electrical power generated by solar panels 188 for later use.

FIGS. 13 and 14 depict an exemplary mounting bracket which may be used to attach the communication assembly to a vertical wall 190. Mounting bracket 148 is similar in shape to gasket 66, however, its length and width may be slightly greater than gasket 66. As also shown in FIG. 13, mounting bracket 148 includes a plurality of apertures 168 positioned in the same manner as apertures 68 on gasket 66. A central opening 162 is also provided in mounting bracket 148. A first flange 149 extends rearwardly away from mounting bracket 148, and also includes apertures 169, as shown. A support member 186 having a horizontally extending flange 192 may be secured to vertical wall 190, such as by using conventional fastening devices. Horizontal flange 192 also includes apertures which are configured to align with apertures 169 on first flange 149 of mounting bracket 148. In this fashion, flange 149 of mounting bracket 148 may be positioned on top of horizontal flange 192 of support member 186, with the apertures of first flange 149 aligned with the apertures on horizontal flange 192. One or more fasteners may be positioned within the aligned apertures and secured thereto, thus securing mounting bracket 148 to support member 186.

Mounting bracket 148 may be attached to a communication assembly (such as the communication assembly of FIG. 4) by positioning the mounting bracket between adjacent modular components. For example, as shown in FIG. 14, mounting bracket 148 may be positioned between light assembly 22C and strobe light assembly 22D. When positioned in this manner, apertures 168 on mounting bracket 148 will align with apertures 57 on the endplates 54 of the adjacent modular components such that when threaded fasteners 70 are passed through apertures 57 on endplates 54, threaded fasteners 70 will also pass through apertures 168 on mounting bracket 148. In this manner, when the adjacent modular components are secured to one another using the threaded fasteners 70, mounting bracket 148 will be securely and tightly positioned between the adjacent modular components. If desired, a gasket 66 may be located above and below mounting bracket 148 in the assembly. In order to provide an appropriate fit, a gasket 66 which is half the thickness of the gasket typically used between adjacent modular components may be employed for this purpose. Finally, if desired, a horizontally-extending abutment member 189 may be attached to the vertical wall 190 at a location beneath support member 186. Abutment member 189 may be configured such that when the communication assembly is attached to vertical wall 190 in the manner described above, abutment member 189 will prevent the lower end of the communication assembly from pivoting towards wall 190.

Finally, it will be noted from FIGS. 6 and 8 that the two U-shaped portions 50 and 51 used to assemble the tubular components may have different depths. When the two U-shaped portions are welded to one another, therefore, seam 55 will be offset from the center line of the longitudinal sidewalls of the tubular component. This offset seam may be advantageous in aligning the modular components during assembly. For example, it may be desirable to ensure that telephone device 30 is positioned on the same side of the communication assembly as area light 43. The offset seams of each tubular component may therefore be aligned with one another in order to help to ensure that the modular components are assembled in the desired orientation.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. For example, modular communication assemblies in accordance with the present invention may assembled in a variety of different vertical arrangements and may be installed by a variety of different methods. Accordingly, while some of the alternative embodiments of the modular communication assembly have been discussed specifically, other embodiments will be apparent or relatively easily developed by those of ordinary skill in the art. Accordingly, this invention is intended to embrace all alternatives, modifications and variations that have been discussed herein, and others that fall within the spirit and broad scope of the claims.

What is claimed is:

1. A modular communication support system comprising:

a plurality of modular components, wherein each of said modular components comprise at least one endwall having a plurality of apertures, said modular components being configured to be interchangeably secured to one another in a plurality of vertical arrangements by a plurality of fasteners extending between respective apertures in adjacent endwalls;

at least one of said modular components comprising a communication device mounting member configured for supporting a communication device, and at least two of said modular components are configured to perform different functions.

2. The modular support system of claim 1, wherein said plurality of modular components includes at least one component chosen from the group consisting of an extension sleeve and a light assembly.

3. The modular support system of claim 1, wherein said plurality of modular components includes a strobe light assembly.

4. The modular support system of claim 1, further comprising an endcap configured to be secured to any one of said modular components.

5. The modular support system of claim 1, further comprising a base member configured for securing the assembled system to a horizontal surface.

6. The modular support system of claim 1, further comprising a mounting bracket configured for securing the assembled system to a vertical surface.

7. The modular support system of claim 1, further comprising at least one gasket configured to be positioned between two of said modular components.

8. The modular support system of claim 1, wherein said endwall is recessed.

9. A modular communication assembly comprising:

a tubular communication device mounting member configured to support a communication device; and a plurality of modular components comprise at least one endwall comprising a plurality of apertures, said modular components being configured to be interchangeably secured to one another in a vertical arrangement by a plurality of fasteners extending between respective apertures in adjacent endwalls and being further configured to be interchangeably secured to said tubular communication device mounting member in a plurality of vertical arrangements, wherein at least two of said modular components are configured to perform different functions.

10. A modular communication assembly as in claim 9, wherein said plurality of modular components comprises at least one component chosen from the group consisting of an extension sleeve and a light assembly.

11. A modular communication assembly as in claim 9, wherein said plurality of modular components includes a strobe light assembly.

12. A modular communication assembly as in claim 9, further comprising an endcap configured to be secured to said mounting member or any one of said modular components.

13. A modular communication assembly as in claim 9, further comprising a base member configured to be secured to a horizontal surface.

14. A modular communication assembly as in claim 9, further comprising a mounting bracket configured for securing the assembled system to a vertical surface.

15. A modular communication assembly as in claim 9, further comprising at least one gasket configured to be positioned between two of said modular components.

16. A modular communication assembly as in claim 9, wherein said plurality of modular components are configured such that they may be assembled in a plurality of vertical arrangements.

* * * * *